F. O. BOSWELL.
AUTOMOBILE LOCK.
APPLICATION FILED OCT. 11, 1920.

1,389,933.

Patented Sept. 6, 1921.
2 SHEETS—SHEET 1.

INVENTOR
Fletcher O. Boswell.
By W. W. Williamson
Atty.

F. O. BOSWELL.
AUTOMOBILE LOCK.
APPLICATION FILED OCT. 11, 1920.

1,389,933.

Patented Sept. 6, 1921.
2 SHEETS—SHEET 2.

INVENTOR
Fletcher O. Boswell.
By H. Williamson
Atty.

UNITED STATES PATENT OFFICE.

FLETCHER O. BOSWELL, OF PHILADELPHIA, PENNSYLVANIA, ASSIGNOR TO AMERICAN WHEEL COMPANY, OF PHILADELPHIA, PENNSYLVANIA, A CORPORATION OF DELAWARE.

AUTOMOBILE-LOCK.

1,389,933.         Specification of Letters Patent.     Patented Sept. 6, 1921.

Application filed October 11, 1920. Serial No. 416,107.

*To all whom it may concern:*

Be it known that I, FLETCHER O. BOSWELL, a citizen of the United States, residing at Philadelphia, in the county of Philadelphia and State of Pennsylvania, have invented new and useful Improvements in Automobile-Locks, of which the following is a specification.

My invention relates to a new and useful improvement in automobile locks, for locking the steering gear of a machine, and is especially adapted for use upon automobiles as the type known as the Ford, and has for its object to provide an exceedingly simple and effective lock of this description which will be readily applied to the steering post of the machine and utilized for locking the steering wheel either to the steering post so as to cause the latter to turn therewith or to said post and the stationary cap surrounding the post, thereby preventing the revolving of the wheel and consequently the revolving of the post.

A further object of my invention is to so combine the lock with the steering wheel hub, supplementary steering post and cap of the steering post casing that these parts may be assembled as a unit and substituted for similar parts of a machine without changing the other parts of the steering mechanism, thus avoiding the expense and delay which would otherwise be necessary to equip an automobile with my improved lock.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 1:
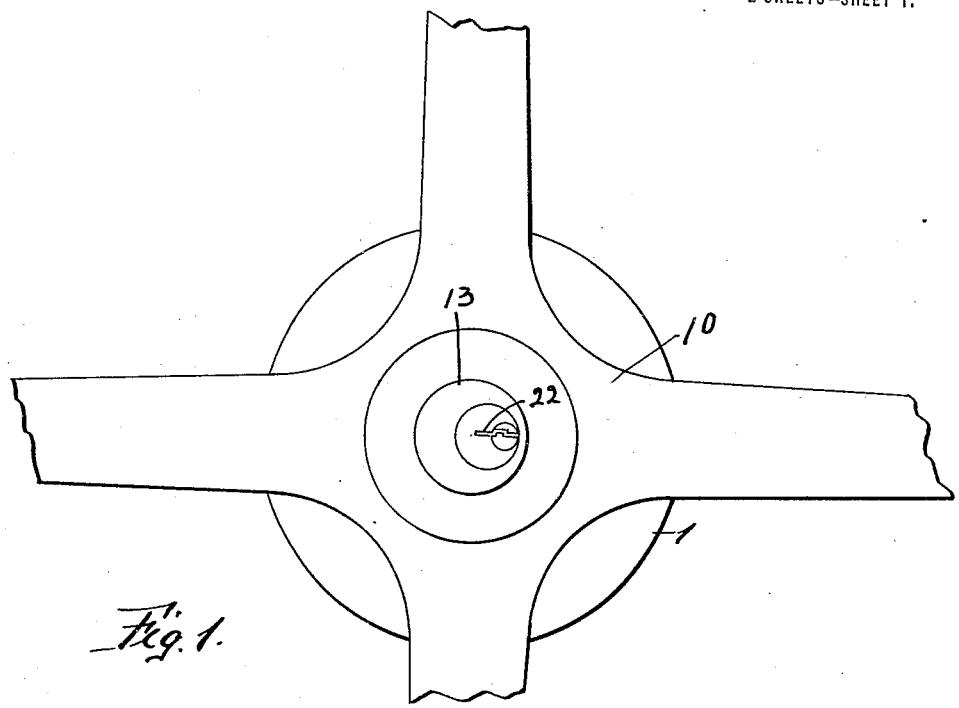
Figure 1, is a plan view of my improvement a portion of the steering wheel being broken away.
Figure 2:
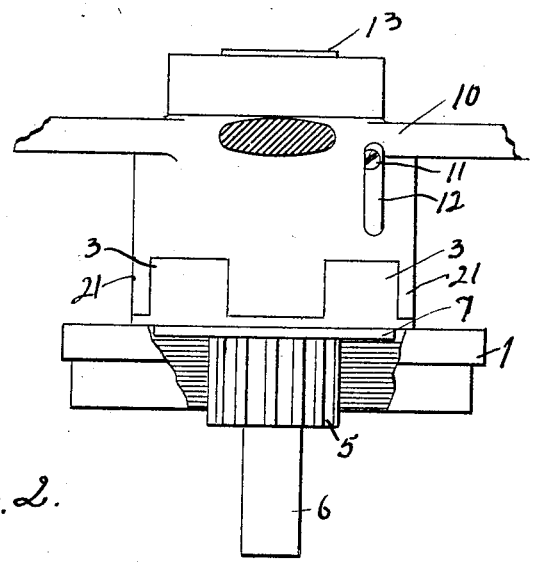
Fig. 2, is a side elevation of Fig. 1, a portion of the casing cap being broken away to clearly show the relation of the pinion with the remaining parts of the device.
Figure 3:
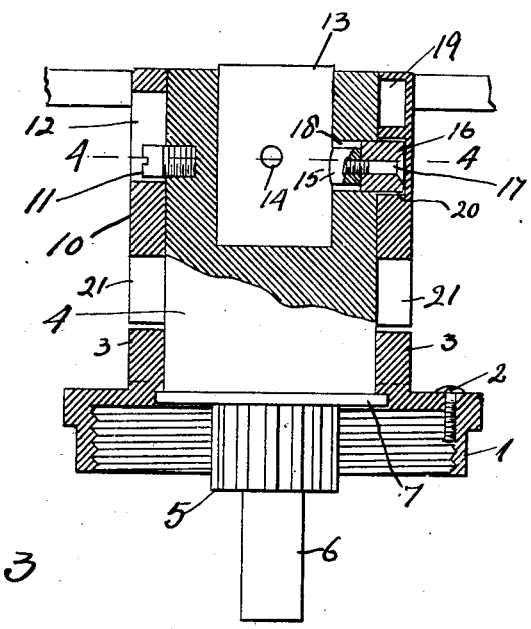
Fig. 3, is a vertical section.
Figure 4:
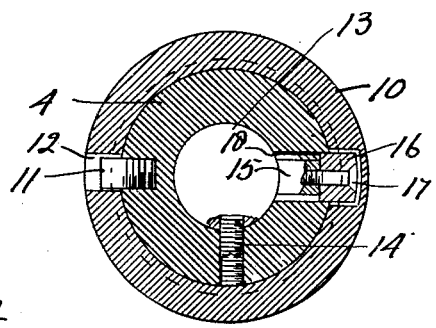
Fig. 4, is a section at the line 4—4 of Fig. 3.

In carrying out my invention as here embodied, 1 represents the cap which is adapted to thread upon the upper end of the steering post casing of a Ford automobile and be secured thereon against rotation by the screw 2 passing through said cap and into said casing. This cap is provided with the clutch teeth 3 for the purpose hereinafter set forth.

4 represents the secondary steering post with which is formed the pinion 5 and the stem 6 the latter being adapted to enter the socket in the main steering post of the machine, while the pinion meshes with the usual planetary pinions through which the main steering post is operated.

Formed with the secondary steering post is a flange 7 which fits within a suitable recess formed in the cap so as to prevent the withdrawal of the post upward when the cap is in place upon its casing.

10 represents the hub of the steering wheel which is fitted upon the upper portion of the secondary steering post so as to slide freely thereon and this hub is prevented from turning independently of the bolt by means of the stop screw 11 which is threaded into the post its outer end projecting into the slot 12 formed through the wall of the hub. This arrangement will not only prevent the turning of the hub independently of the post but will also limit the sliding movement of said hub. The post 4 has a central bore of sufficient size to receive the lock 13 which latter is held in place by the screw 14 threaded through the post and projecting into a hole in said lock; and as this screw is inclosed by the hub the lock cannot be removed until the hub has been removed from the post.

15 represents the bolt of the lock to which is secured an extension 16, said extension preferably being of hardened steel and secured upon the end of the bolt by the screw 17. The extension being of a diameter to snugly fit and slide within the hole 18 formed with the post, thereby reducing the liability of the sheering off of this bolt in the manipulation of the steering wheel.

Within the hub are formed the keeper recesses 19 and 20 adapted to receive the extension 16 of the bolt when the latter is shot outward by the proper manipulation of the lock mechanism so as to hold the hub in either an upper or lower position for the purpose hereinafter set forth.

The lower edge of the hub 10 has formed therewith the clutch teeth 21 which are adapted to engage with the clutch teeth 3 formed upon the cap 1 and when these clutch teeth are in engagement the hub of the steering wheel will be firmly held against rotation. Thus it will be seen that when the steering wheel hub is lowered to effect the engagement of the clutch teeth and locked in this lowered position by the shooting of the lock bolt into the upper recess 19 the steering mechanism will be effectually secured against manipulation thereby preventing the unauthorized use of the automobile.

When it is desired to free the steering mechanism it is only necessary to retract the locking bolt by the proper manipulation of the lock mechanism, raise the steering wheel and its hub upward and again manipulate the locking mechanism and shoot the bolt into the lower keeper recess 20. When the steering wheel is thus elevated and locked to the post the post may be freely turned in either direction by said wheel thus steering the machine.

When the steering wheel hub is locked to the cap as before described, the cap cannot be threaded off its casing to dismember the device since the pinion 5 meshing with the planetary pinions within the casing is limited to three or four revolutions in either direction and these are not sufficient to back the cap off the threads of the casing so that even though the screw were removed the mechanism would not be disassembled.

One of the prime advantages of my present improvement is that the pinion, post and flange are made in one piece and that the lock is secured within the central bore of the post and the hub secured upon the post so that the entire assembly including the cap may be substituted for the pinion, post and cap of the Ford type of machine without any mechanical work other than the backing off of the original cap and the substitution therefor or the cap of my improved device.

From the foregoing description it will be seen that an exceedingly simple and effective locking mechanism is provided for the steering gear of an automobile and that the same is rigid and durable and cannot be dismembered except by the use of the proper key for insertion in the key hole 22.

Of course I do not wish to be limited to the exact details of construction as herein shown as these may be varied within the limits of the appended claims without departing from the spirit of my invention.

Having thus fully described my invention, what I claim as new and useful is:—

1. In a device of the character described, a stationary cap having clutch teeth formed thereon, a secondary steering post fitted to turn in said cap, said post having formed therewith a flange and a pinion, a steering wheel hub fitted to slide upon said post, clutch teeth formed with the lower edge of said hub for engagement with the first named clutch teeth, a stop screw partially threaded into the post and projecting into a slot formed in the hub, a lock secured within a central bore formed in the post, and two keeper recesses formed in the inner wall of the hub for the reception of the bolt of the lock to secure said hub in either of two positions.

2. In a device of the character described, a cap adapted to be secured upon the steering post casing of an automobile, clutch teeth formed upon said cap, a post fitted to revolve in the cap and pinion formed with said post, a lock secured in a central bore formed in the post, a locking bolt adapted to be actuated by said lock, an extension secured to said locking bolt, a hub fitted to slide upon the post, a screw projecting through a slot in said hub and threaded into the post for limiting the sliding movement of said hub, two keeper recesses formed in the inner wall of the hub adapted to receive the extension of the locking bolt, clutch teeth formed with the lower edge of the hub adapted to be held into engagement with or out of engagement from the first named clutch teeth by the shooting of the extension of the locking bolt into one or the other of said keeper recesses.

3. In a device of the character described, a cap adapted to thread upon the steering post casing of an automobile, means for securing said cap against rotation, clutch teeth formed with said cap, a secondary steering post adapted to revolve in said cap, means for preventing the withdrawal of the post from the cap, a pinion formed with the post, a steering wheel hub adapted to have a limited sliding movement upon the post, clutch teeth formed upon said hub for engagement with the first named clutch teeth, and means for locking the hub in either an elevated or lowered position whereby the clutch teeth are held in engagement or disengagement.

In testimony whereof, I have hereunto affixed my signature.

FLETCHER O. BOSWELL.